US011755290B2

(12) United States Patent
Bessiere et al.

(10) Patent No.: US 11,755,290 B2
(45) Date of Patent: Sep. 12, 2023

(54) GENERATING OVERRIDE-ROBUST EXPERIENCE ANALYTICS SCRIPT

(71) Applicant: Content Square SAS, Paris (FR)

(72) Inventors: Bastien Bessiere, Paris (FR); Yaron Bar, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/854,913

(22) Filed: Jun. 30, 2022

(65) Prior Publication Data

US 2023/0205492 A1    Jun. 29, 2023

Related U.S. Application Data

(60) Provisional application No. 63/293,586, filed on Dec. 23, 2021.

(51) Int. Cl.
*G06F 8/30*      (2018.01)
*G06Q 10/0639*   (2023.01)

(52) U.S. Cl.
CPC ......... *G06F 8/30* (2013.01); *G06Q 10/06393* (2013.01)

(58) Field of Classification Search
CPC .............................. G06F 8/30; G06Q 10/06393
USPC ....................................................... 717/106
See application file for complete search history.

(56) References Cited

U.S. PATENT DOCUMENTS

| 2012/0078707 A1* | 3/2012 | Ramakrishnan et al. .................. G06F 8/30 705/14.41 |
| 2014/0282464 A1* | 9/2014 | El-Gillani ................. G06F 8/65 717/168 |
| 2017/0132024 A1* | 5/2017 | Desineni et al. ......... G06F 8/30 |

* cited by examiner

*Primary Examiner* — Wei Y Zhen
*Assistant Examiner* — Mohammed N Huda
(74) *Attorney, Agent, or Firm* — Schwegman Lundberg & Woessner, P.A.

(57) ABSTRACT

A method of generating an experience analytics script that is override-robust starts with processor receiving a script and generating, based on the script, an experience analytics script that is override-robust. Generating the experience analytics script comprises identifying expressions in the script referencing browser native functions of a browser, and replacing the expressions referencing the native functions of the browser with expressions including one or more references that are set at upon execution. The processor causes the experience analytics script to be executed on the browser of a customer client device. Upon execution of the experience analytics script, a value of the one or more references are set to an iframe window. The iframe window is associated with an iframe providing access to a pure untouched version of the native functions of the browser. Other embodiments are described herein.

20 Claims, 8 Drawing Sheets

GENERATING OVERRIDE-ROBUST EXPERIENCE ANALYTICS SCRIPT

BACKGROUND

Electronic commerce (e-commerce) facilitates trillions of dollars in transactions yearly. Using their personal electronic devices, users can quickly and easily access a business' website or mobile application to purchase goods or services directly from the business.

It is imperative to understand the online customers' digital behaviors and gather insights therefrom. For example, the digital behaviors can include the navigational patterns of the user to the website or within the website as well as interactions with the elements displayed on the website. Improving the online customers' digital experience on the website will directly leads to increased sales and revenue growth from website or mobile application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

To understand the online customers' digital behaviors, the online customer's digital interactions on the webpage needs to be tracked and analyzed. A tracking tag can be a JavaScript code that is built on a repository and further built into an experience analytics script 122, which is a large JavaScript file that is loaded on client websites. When the tracking tag is loaded, the environment in which it is loaded is unexpected. For example, the client may be causing an override of native JavaScript functions on their webpage using the client's internal scripts or using third-party scripts or libraries that are added to the webpage (e.g., XML override, HTTP request overrides, etc.).

The tracking tag in the scripts may be using calls to the native functions of a browser in order to track the user's interactions on a webpage. Accordingly, when the client or the third party library overrides the native JavaScript functions, the scripts may not function as expected or may result in complete failures. For instance, the tracking tag implemented by the scripts be using an object (e.g., browser screen call) which provides the dimensions of the browser screen. If this native function provided by the browser has been modified by an override, the wrong result is returned (e.g., 0 or undefined) to the experience analytics server system 124 which can cause a failure in the product page view being displayed to the client's device.

Among other things, embodiments of the present disclosure improve the functionality of digital experience tracking systems by generating override-robust experience analytics script to be executed on the client's (e.g., business, retail, etc.) webpage that is immune from the native JavaScript functions of the browser being overridden by the client or by a third party library.

As further discussed below, the experience analytics server system 124, the experience analytics server 116, a combination thereof, a portion thereof, or a processor in either of systems can generate an experience analytics script 122 in FIG. 1 that is override-robust by modifying expressions in a script to reference an iframe window that provides access to a pure untouched version of the native functions of the browser. Accordingly, the tracking tags implemented by the experience analytics script 122 can use the native functions, via the iframe window, to collect data, format the data, send the data to experience analytics server system 124, etc.

Networked Computing Environment

Figure 1:
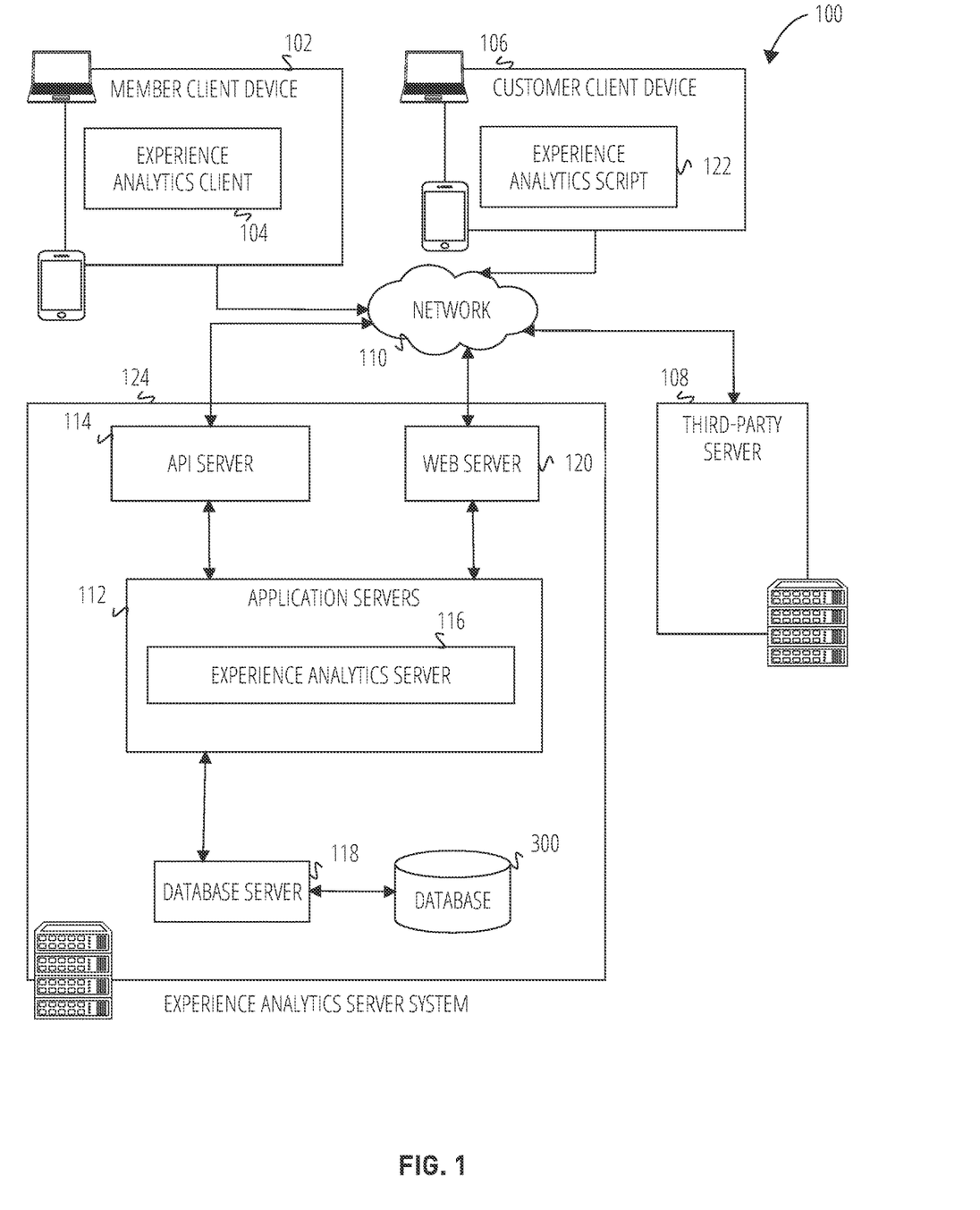
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122, In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDKOID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
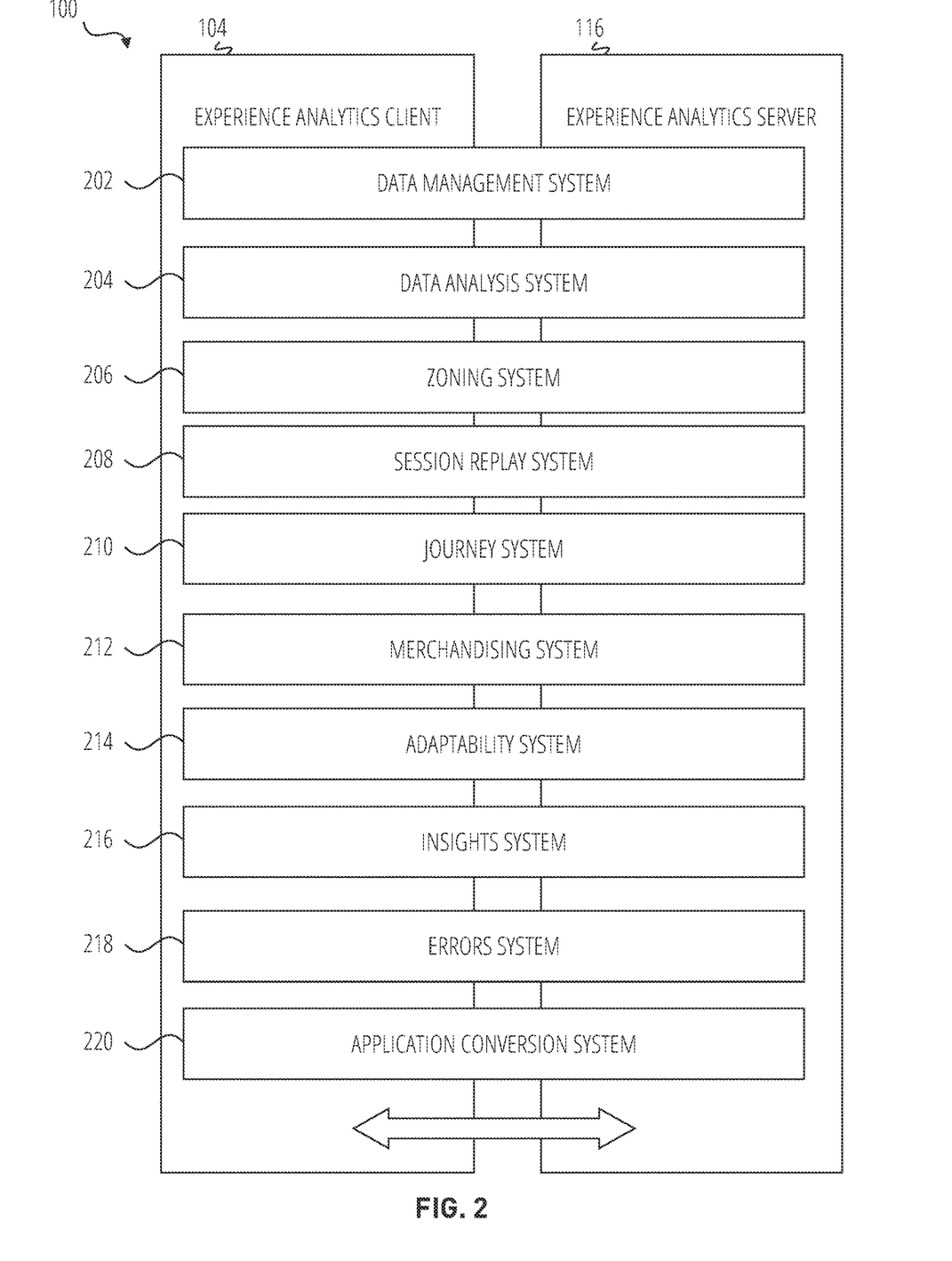
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
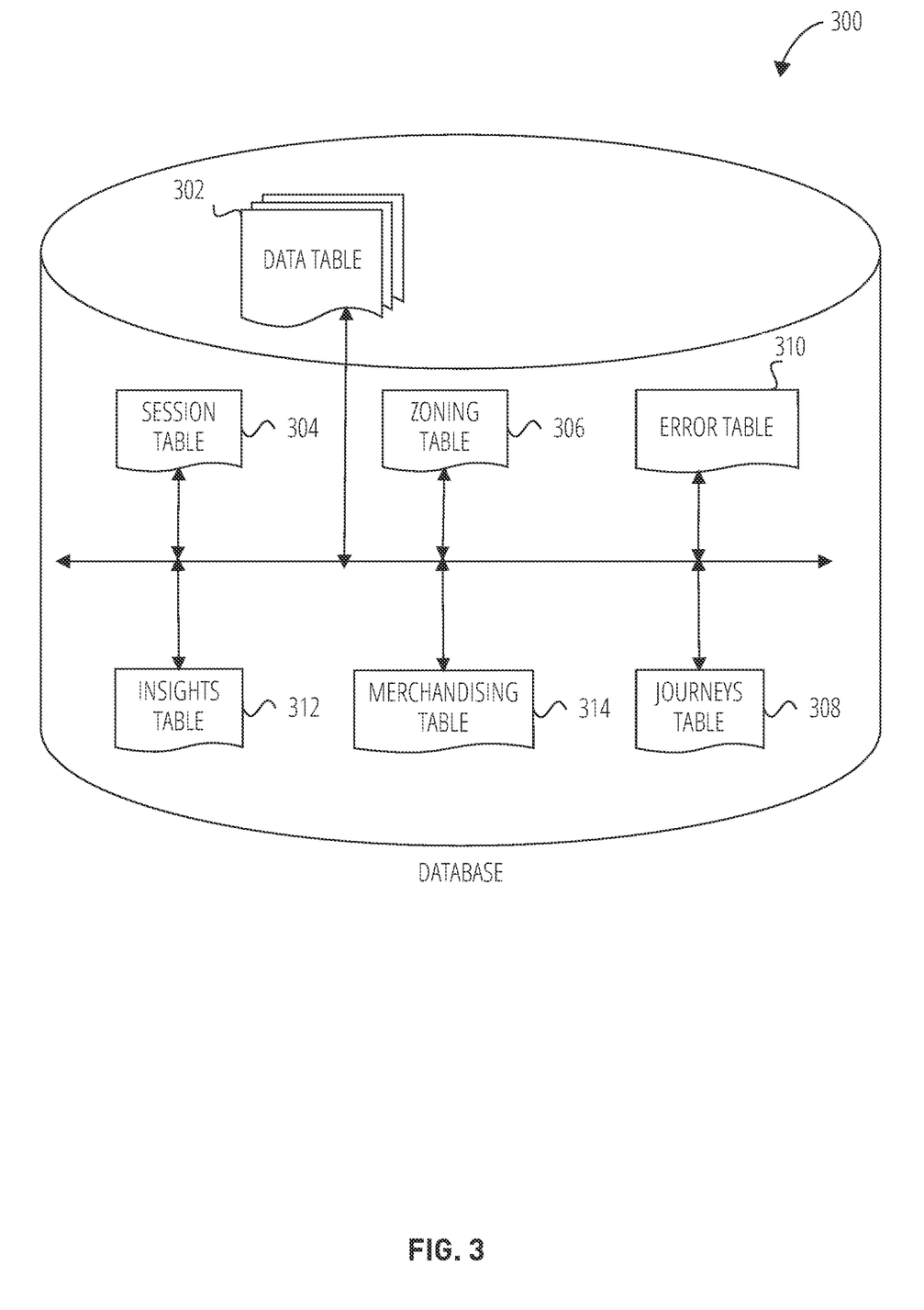
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Process of Generating Override-Robust Experience Analytics Script

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
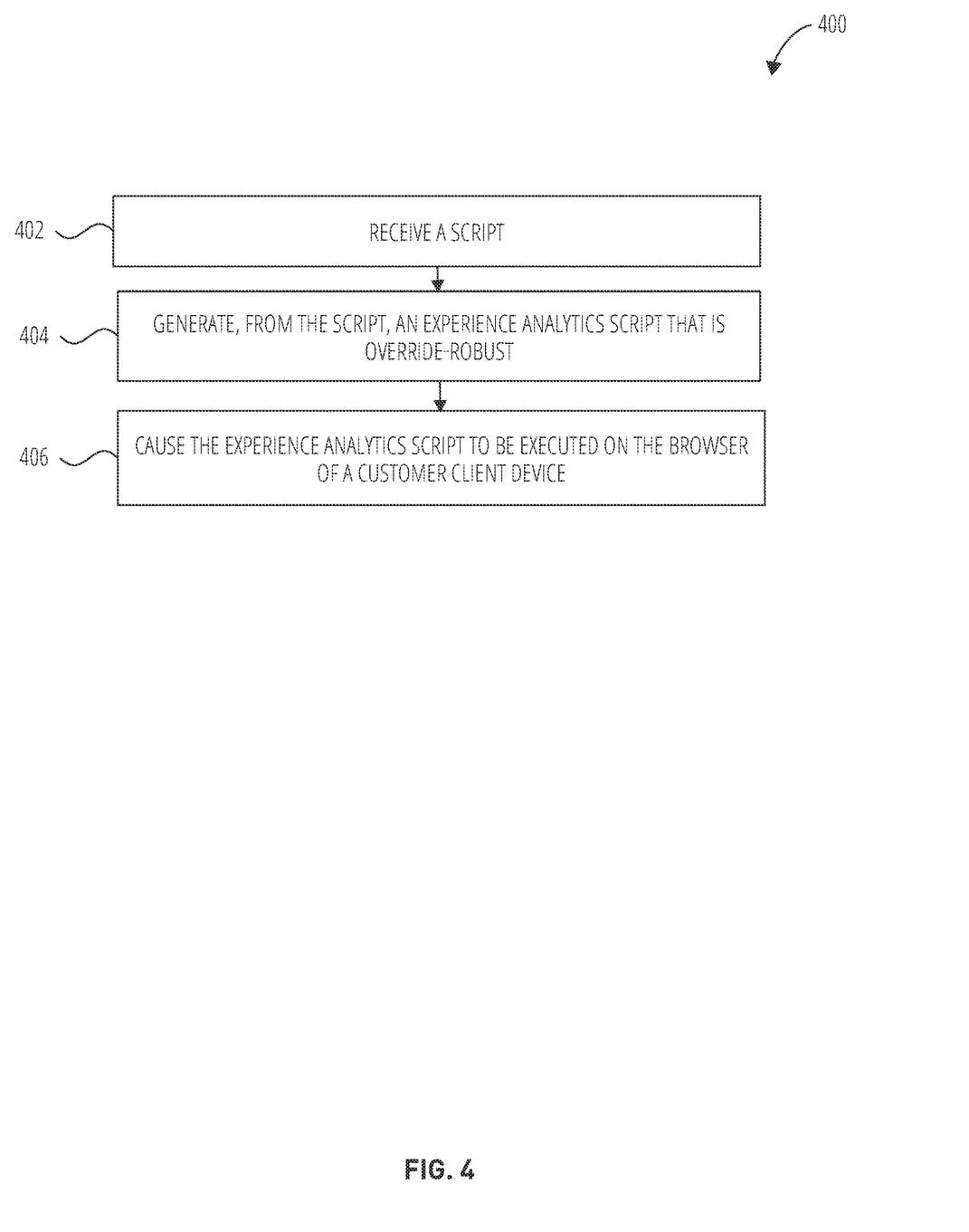
FIG. 4 illustrates a process 400 of generating override-robust experience analytics script in accordance with one embodiment.

FIG. 4 is a flowchart for a process of generating override-robust experience analytics script in accordance with some examples. The process 400 can be performed by experience analytics server system 124, the experience analytics server 116, any combination thereof, or any portion thereof, such as a processor included in any of the systems. The process 400 can be performed, in whole or in part, by at least one plug-in custom processor. In one example, the process 400 can be implemented as a plug-in that is run on the script (e.g., a source file) to automatically replace expressions to reference the pure iframe window to generate the override-robust experience analytics script 122.

In one example, the process 400 in FIG. 4 involves transpiling a script source code. In operation 402, a processor receives a script. In one example, the script is a source file that incorporates a scripting language such as TypeScript or JavaScript. In another example, the script received in operation 402 is a source file that is written in TypeScript and then transpiled to JavaScript using Webpack.

In operation 404, the processor generates, from the script, an experience analytics script that is override-robust. In one example, using Webpack, the script received in operation 402 is transpiled to a minimized JavaScript file. Transpiling comprises translating and compiling to convert the source code of one language (e.g., TypeScript) into the source code of another language (e.g., JavaScript). In one example, the experience analytics script 122 comprises a scripting language such as JavaScript.

The script received in operation 402 can include expressions (e.g., calls) to the native functions of a browser in order to track the user's interactions on a webpage. When the client or the third party library overrides the native JavaScript functions, the scripts may not function as expected or intended. In order to generate in operation 404 an experience analytics script 122 that is immune from the native JavaScript functions of the browser being overridden by the client or by a third party library (e.g., override-robust), the processor modifies expressions in a script to reference an iframe window that provides access to a pure untouched version of the native functions of the browser.

In one example, a plurality of plug-in custom processors detect expressions that use JavaScript functions or Document Object Model (DOM) object properties and the plug-in custom processors rewrite these expressions to reference a protected version (e.g., an iframe that provides access to native functions of the browser that has not been overridden) that the experience analytics script 122 will create upon execution. Further details on operation 404 are discussed with reference to FIG. 5 below.

In operation 406, the processor causes the experience analytics script to be executed on the browser of a customer client device. In one example, the experience analytics script 122 then executes a tracking tag on the browser of the customer client device 106. The tracking tag is immune to native function overrides because, instead of referencing the native functions of the browser, the tracking tag includes expressions that reference an iframe window that provides access to a pure untouched version of the native functions of the browser. For instance, the tracking tags can use the native functions to collect data, format the data, send the data to experience analytics server system 124, etc.

In one example, the processor receives, from the customer client device 106, user activity data associated with interactions by a user with a website displayed on the customer client device. The website can include at least one webpage that is displayed to the user from entry onto the website to the exit (e.g., during a session).

Figure 5:
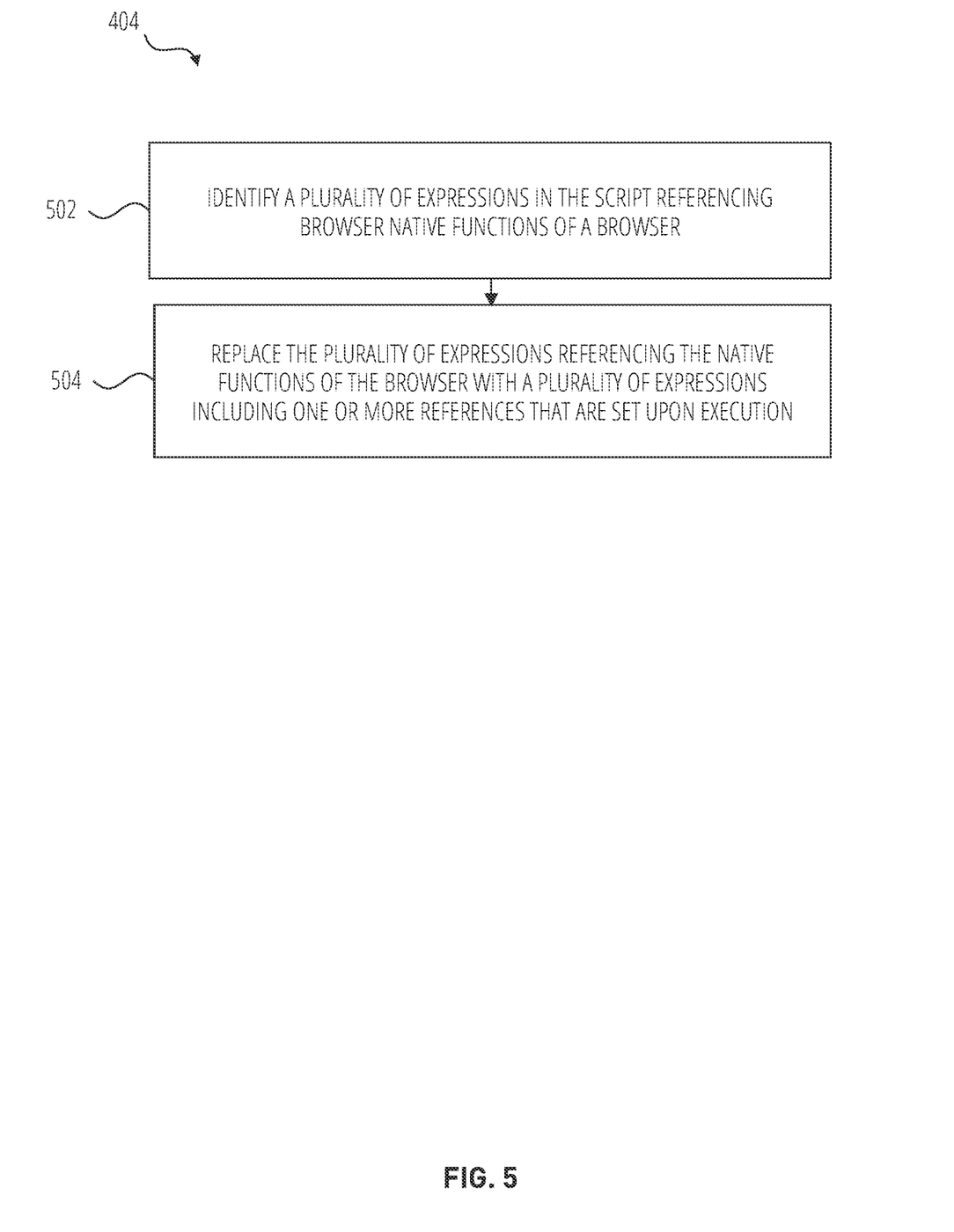
FIG. 5 illustrates a process including the details of the operation 404 of FIG. 4 in accordance with one embodiment.

FIG. 5 illustrates details of the operation 404 of generating the experience analytics script that is override-robust in FIG. 4 in accordance with one embodiment.

As shown in FIG. 5, to generate the experience analytics script that is override-robust, the processor can identify expressions in the experience analytics script referencing browser native functions of a browser, at operation 502. In one example, plug-in custom processors detect and identify expressions that use JavaScript functions or Document Object Model (DOM) object properties.

In one example, identifying the expressions referencing the native functions of the browser can include using transformers to identify entities referencing the native functions of the browser, Entities can include a scripting language (e.g., typescript), a string, an array, a node, a date, an event, or any combination thereof. The transformers can include, for example; a scripting language transformer (e.g., a TypeScript transformer), a string transformer, an array transformer, a node transformer, a date transformer, or an event transformer.

At operation 504, the processor replaces the expressions referencing the native functions of the browser with expressions including one or more references that are set upon execution. In one example, the plug-in custom processors can rewrite the expressions that use JavaScript functions or DOM object properties to a reference that is set upon script execution.

The iframe is associated with a pure untouched version of native functions of the browser. The iframe can comprise the iframe window which can be referenced by expressions in an experience analytics script 122 in order to access the native functions of the browser that have not been overridden (e.g., pure untouched version).

For example, the expressions related to an array entity referencing the native function of the browser (e.g., Array) could be replaced by a reference (e.g., csArray). As discussed further in reference to FIG. 6, the experience analytics script 122 will create the iframe upon execution of the experience analytics script 122 on a customer's client device. The value of the reference (e.g., csArray) can be set upon execution of the script on a customer's client device (e.g., in runtime) to a protected version of the native functions of the browser (e.g., the iframe window) if the iframe is successfully created. The value of the reference (e.g., csArray) if the iframe is successfully created can be pureWindowReference.Array (e.g., csArray=pureWindowReference.Array). If the iframe is determined not to be created successfully, as a fallback, the value of the reference (e.g., csArray) can reference the original, unprotected window functions (e.g., csArray=window.array).

Similarly, an expression including a native function that is related to a date (e.g., Date) can be replaced by a reference (e.g., csDate). The value of the reference csDate can be set to a protected version of the native functions of the browser (e.g., pureWindowReference.Date.now( )) or to reference the original, unprotected window functions (e.g., Date.now( )).

In addition to replacing the reference, a subsequent call by reference can be used to ensure access to the native functions of the browser. For example, a native function that is a Node element getter (e.g., childNodes) can be altered to include another getter to the Node element (e.g., Object.defineProperty (Node.Prototype, "cs_childNodes", Object.getOwnPropertyDescriptor(native.Node.prototype, "childNodes"). Similarly, getters and function references can be generated for other Document Object Model (DOM) types or elements in order to protect against native function overrides.

In one example, replacing the expressions referencing the native functions of the browser comprises replacing, using the plurality of transformers, expressions in the entities referencing the native functions of the browser with the expressions including one or more references that are set upon execution. In one example, the transformers can also be used to identify the expressions in operation 502.

In one example, any of the transformers can be implemented during the build stage on each node in a tree associated with the tracking tag of the experience analytics script 122 in order to update the node with the reference to the iframe window (e.g., pureWindowReference). For example, the processor can identify expressions referencing the native function associated with an array in operation 502 and replace the expressions (e.g., array) using the array transformer to expressions including one or more references that are set upon execution (e.g., csArray) in operation 504, Similarly, the processor can identify expressions referencing the native function associated with a date in operation 502 and replace the expressions (e.g., date) using the date transformer to expressions including one or more references that are set upon execution (e.g., csDate) in operation 504.

The processor can also identify expressions referencing the native function associated with a string in operation 502 and replace the expressions (e.g., string or string literal) using the date transformer to expressions including one or more references that are set upon execution (e.g., csString) in operation 504. In one example, the processor can also analyze the expression (or the identifier) that is identified in operation 502 that may be transformed in operation 504, and further identifies the type associated with the expression, Using the type associated with the expression, the processor can replace expressions in operation 504 that are associated with a specific type.

Accordingly, the processor, using the transformers, can detect defined expressions in the code (e.g., script) that is to be protected from overrides to the native functions in the browser and transforms the reference in the expressions to not use the native JavaScript functions in the current window context (e.g., current browser) but rather to reference the functions in the iframe is created to provide the pure untouched native functions.

Process of the Loading of the Override-Robust Experience Analytics Scripts

Figure 6:
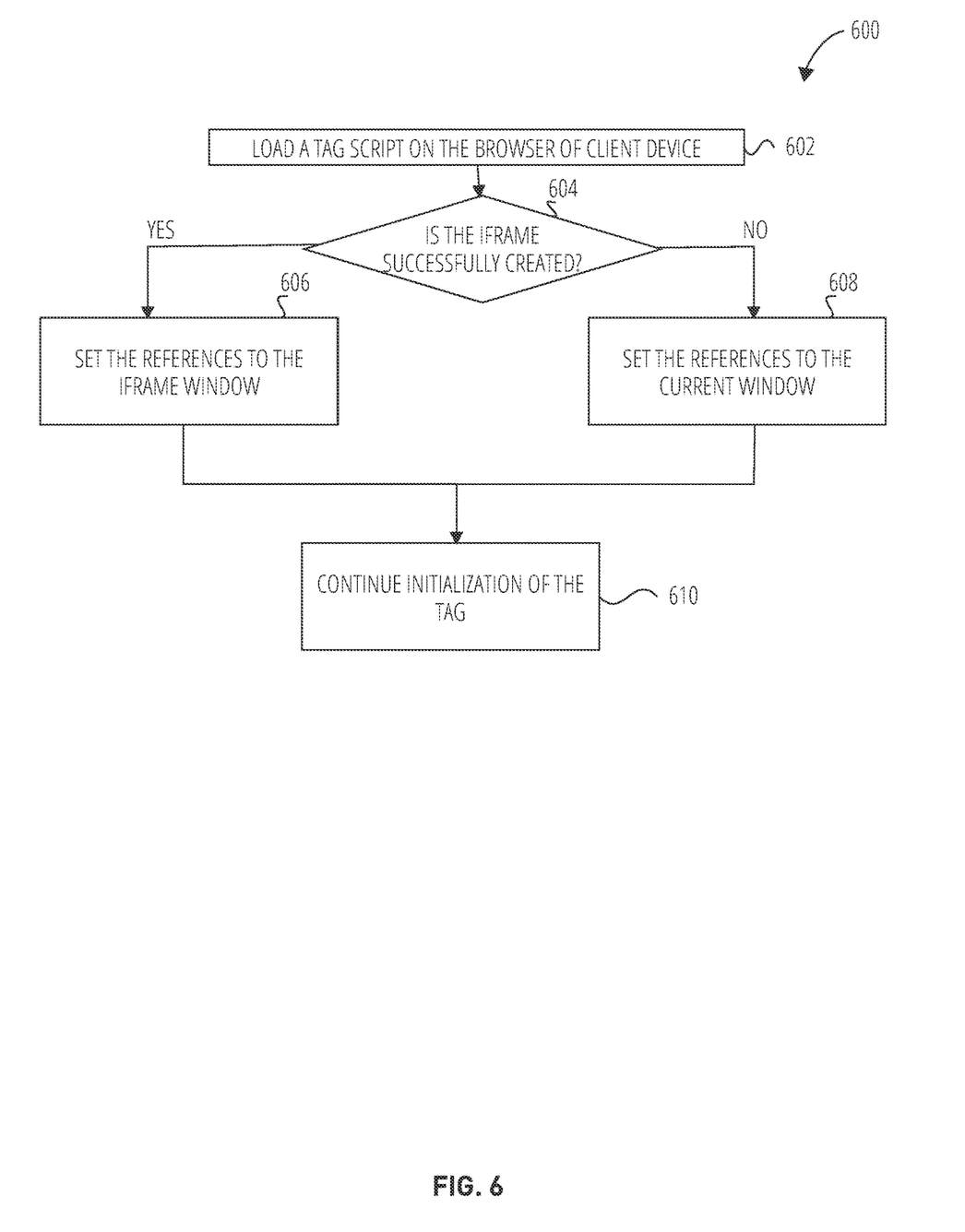
FIG. 6 illustrates a process 600 of the loading of the override-robust experience analytics scripts in accordance with one embodiment.

FIG. 6 illustrates a process 600 of the loading the override-robust experience analytics scripts in accordance with one embodiment. In one example, a tracking tag script included in the experience analytics script 122 is loaded on the browser of the customer's client device at operation 602, In one example, the experience analytics script 122 can be the tracking tag script. Referring back to FIG. 5, operation 504, in the experience analytics script 122, the expressions referencing the native functions of the browser are replaced with expressions including one or more references that are set upon execution. The tracking tag script can, for instance, include expressions including one or more references that are set upon execution of the experience analytics script 122 on the browser of the customer's client device. For example, the tracking tag script can include expressions including references such as csArray, csDate, and csString.

When the tracking tag script is loaded or upon execution, the iframe is attempted to be generated on the client's website. The iframe is associated with a pure untouched version of native functions of the browser. The iframe can comprise the iframe window which can be referenced by expressions in an experience analytics script 122 in order to access the native functions of the browser that have not been overridden (e.g., pure untouched version).

At operation 604, execution of the tracking tag script causes a determination to be made as to whether the creation of the iframe was successful. If the iframe was determined to be successfully created, then, at operation 606, the references in the experience analytics script 122 are set to the iframe window associated with the iframe.

Accordingly, the value of the references in the experience analytics script 122 is set to the iframe window.

For example, the expressions including the reference that is related to an array (e.g., let a=[1,2,3]) are set to the iframe window (e.g., let a=pureWindowReference.Array(1,2,3)). In another example, the expressions including the reference that is related to a date (e.g., let date=Date.now( )) are set to the iframe window (e.g., let date=pureWindowReference.Date.now( )).

In addition to updating the value of the reference, a subsequent call by reference can be used to ensure access to the native functions of the browser. For example, a native function that is a Node element getter (e.g., childNodes) can be altered to include another getter to the Node element (e.g., Object.defineProperty (Node.Prototype, "cs_childNodes", Object.getOwnPropertyDescriptor(native.Node.prototype, "childNodes"). Similarly, getters and function references can be generated for other Document Object Model (DOM) types or elements in order to protect against native function overrides.

In one example, setting the value of the references in the experience analytics script 122 to the iframe window comprises setting the value using the plurality of transformers. In one example, any of the transformers can be implemented during the build stage on each node in a tree associated with the tracking tag of the experience analytics script 122 in order to update the node with the reference to the iframe window (e.g., pureWindowReference). For example, at runtime of the experience analytics script 122, setting the value of the references in the experience analytics script 122 to the iframe window.

For example, using the array transformer, the value of the references in the experience analytics script 122 related to an array (e.g., csArray) can be set to the iframe window (e.g., csArray=pureWindowReference.array) in operation 606.

Similarly, using the date transformer, the value of the references in the experience analytics script 122 related to a date (e.g., csDate) can be set to the iframe window (e.g., csDate=pureWindowReference.Date) in operation 606.

Using the string transformer, the value of the references in the experience analytics script 122 related to a string or string literal (e.g., csString) can be set to the iframe window (e.g., pureWindowReference.string) in operation 606.

If the iframe was determined not to be successfully created, then, at operation 608, the references in the experience analytics script 122 are set to the current window (e.g., the client's browser). Operation 608 can be a fallback operation.

For example, using the array transformer, the value of the references in the experience analytics script 122 related to an array (e.g., csArray) can be set to the current window (e.g., csArray=window.array) in operation 608. The current window provides the original, unprotected window functions that could have been overridden by the client.

Once the references in the experience analytics script 122 are set, either in operation 606 or operation 608, initialization of the tag continues, at operation 610.

Machine Architecture

Figure 7:
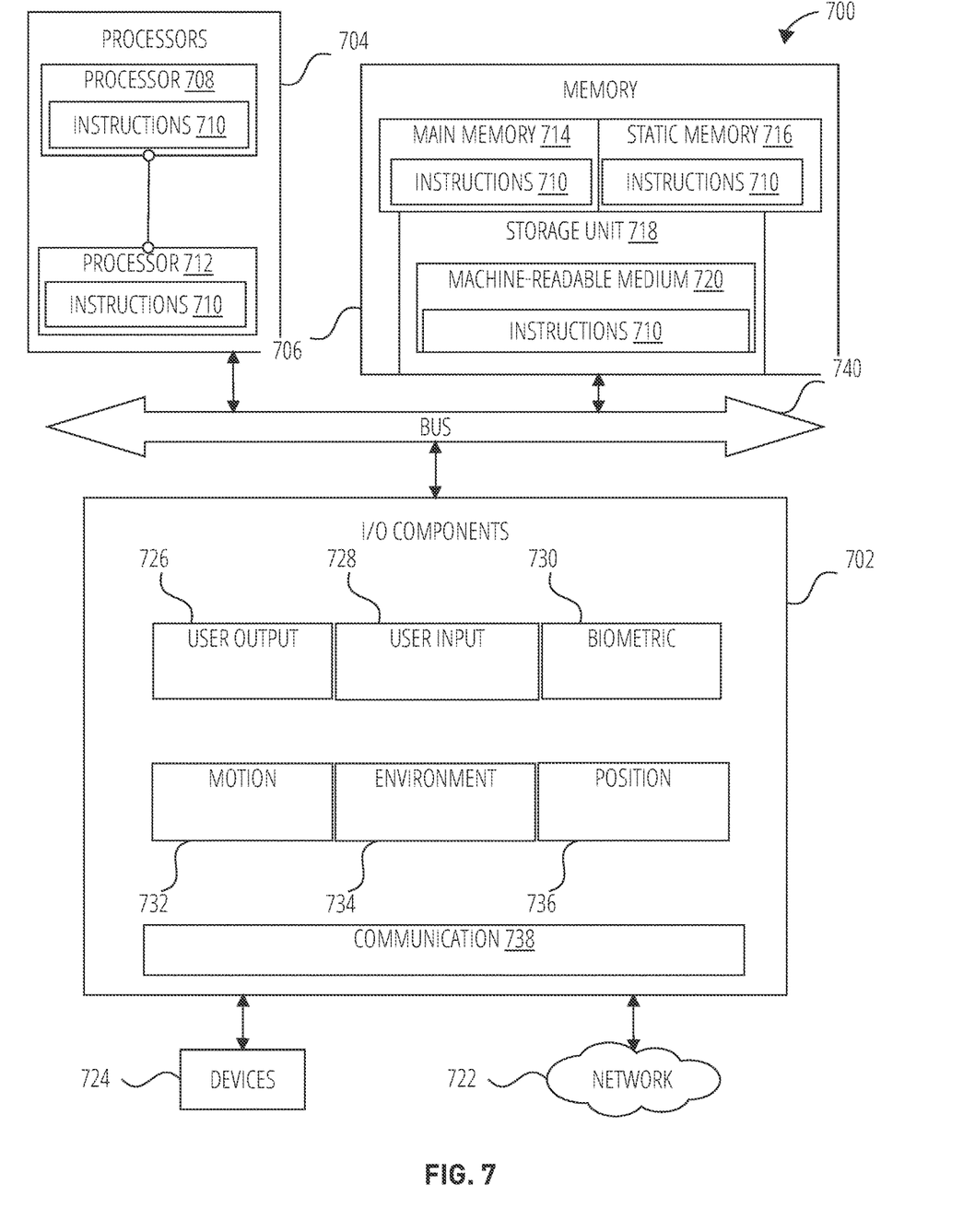
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an application, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines, in a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the member client device 102 or any one of a number of server devices forming part of the experience analytics server 116. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced Instruction Set. Computing (RISC)

Processor, a Complex Instruction Set Computing (CISC) Processor, a Graphics Processing Unit (GPU), a Digital Signal Processor (DSP), an Application Specific Integrated Circuit (ASIC), a Radio-Frequency integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LC)), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with stilt image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface component or another suitable device to interface with the network 722. In further examples, the communication components 738 may include wired communication components, wireless communication components, cellular communication components, Near Field Communication (NFC) components, Bluetooth® components (e.g., Bluetooth®Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)), Similarly, the instructions 710 may be transmitted or received using a transmission medium via a coupling (e.g., a peer-to-peer coupling) to the devices 724.

Software Architecture

Figure 8:
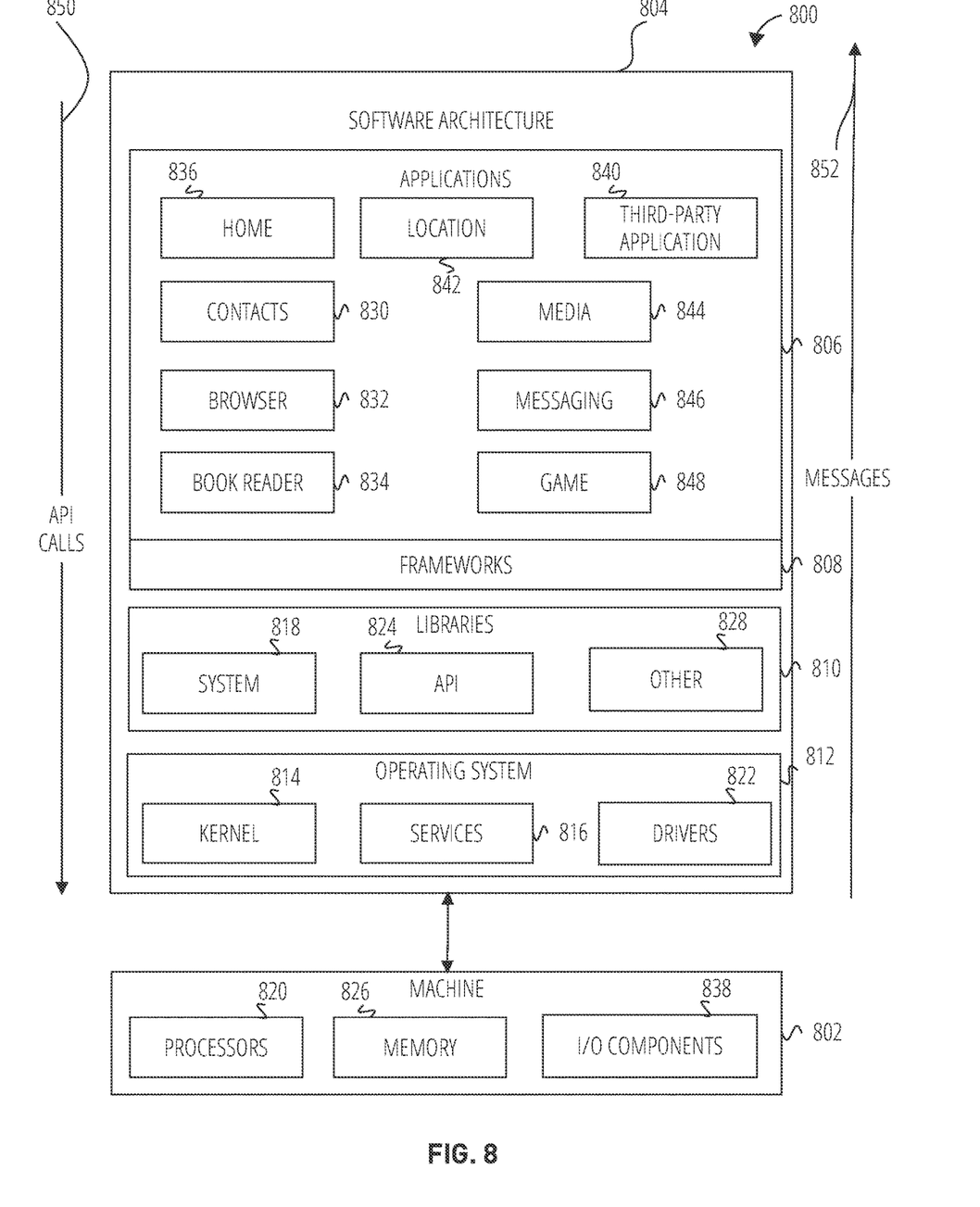
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor, Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
receiving, by a processor, a script;
generating, from the script, an experience analytics script that is override-robust, wherein generating the experience analytics script comprises:
identifying a plurality of expressions in the script referencing browser native functions of a browser, and
replacing the plurality of expressions referencing the native functions of the browser with a plurality of expressions including one or more references that are set upon execution; and
causing the experience analytics script to be executed on the browser of a customer client device,
wherein, upon execution of the experience analytics script,
an iframe window is created on the customer client device, and
a value of the one or more references are set to the iframe window,
wherein the iframe window is associated with an iframe providing access to a pure untouched version of the native functions of the browser.

2. The method of claim 1, wherein identifying the plurality of expressions referencing the native functions of the browser further comprises:
identifying, using a plurality of transformers, a plurality of entities referencing the native functions of the browser.

3. The method of claim 2, wherein the plurality of entities comprises a scripting language, a string, an array, a node, a date, or an event.

4. The method of claim 3, wherein the plurality of transformers comprises a scripting language transformer, a string transformer, an array transformer, a node transformer, a date transformer, or an event transformer.

5. The method of claim 2, wherein replacing the plurality of expressions referencing the native functions of the browser comprises:
replacing, using the plurality of transformers, expressions in the plurality of entities referencing the native functions of the browser with the expressions including the one or more references that are set upon execution.

6. The method of claim 1, further comprising:
generating the iframe associated with the pure untouched version of native functions, wherein the iframe comprises the iframe window.

7. The method of claim 1, further comprising:
receiving, from the customer client device, user activity data associated with interactions by a user with a website displayed on the customer client device, wherein the website comprises at least one webpage displayed during a session.

8. A system comprising:
a processor; and
a memory storing instructions that, when executed by the processor, configure the system to perform operations comprising:
receiving a script;
generating, from the script, an experience analytics script that is override-robust, wherein generating the experience analytics script comprises:
identifying a plurality of expressions in the script referencing browser native functions of a browser, and
replacing the plurality of expressions referencing the native functions of the browser with a plurality of expressions including one or more references that are set upon execution; and
causing the experience analytics script to be executed on the browser of a customer client device,
wherein, upon execution of the experience analytics script,
an iframe window is created on the customer client device, and a value of the one or more references are set to the iframe window, wherein the iframe window is associated with an iframe providing access to a pure untouched version of the native functions of the browser.

9. The system of claim 8, wherein identifying the plurality of expressions referencing the native functions of the browser further comprises:

identifying, using a plurality of transformers, a plurality of entities referencing the native functions of the browser.

10. The system of claim 9, wherein the plurality of entities comprises a scripting language, a string, an array, a node, a date, or an event.

11. The system of claim 10, wherein the plurality of transformers comprises a scripting language transformer, a string transformer, an array transformer, a node transformer, a date transformer, or an event transformer.

12. The system of claim 9, wherein replacing the plurality of expressions referencing the native functions of the browser comprises:

replacing, using the plurality of transformers, expressions in the plurality of entities referencing the native functions of the browser with the expressions including the one or more references that are set upon execution.

13. The system of claim 9, wherein the operations further comprising:

generating the iframe associated with the pure untouched version of native functions, wherein the iframe comprises the iframe window.

14. The system of claim 9, wherein the operations further comprising:

receiving, from the customer client device, user activity data associated with interactions by a user with a website displayed on the customer client device, wherein the website comprises at least one webpage displayed during a session.

15. A non-transitory computer-storage medium storing instructions that when executed by a processor, cause the processor to perform operations comprising:

receiving a script;

generating, from the script, an experience analytics script that is override-robust, wherein generating the experience analytics script comprises:

identifying a plurality of expressions in the script referencing browser native functions of a browser, and replacing the plurality of expressions referencing the native functions of the browser with a plurality of expressions including one or more references that are set at upon execution; and causing the experience analytics script to be executed on the browser of a customer client device, wherein, upon execution of the experience analytics script, an iframe window is created on the customer client device, and a value of the one or more references are set to the iframe window, wherein the iframe window is associated with an iframe providing access to a pure untouched version of the native functions of the browser.

16. The non-transitory computer-storage medium of claim 15, wherein identifying the plurality of expressions referencing the native functions of the browser further comprises:

identifying, using a plurality of transformers, a plurality of entities referencing the native functions of the browser.

17. The non-transitory computer-storage medium of claim 16, wherein the plurality of entities comprises a scripting language, a string, an array, a node, a date, or an event.

18. The non-transitory computer-storage medium of claim 17, wherein the plurality of transformers comprises a scripting language transformer, a string transformer, an array transformer, a node transformer, a date transformer, or an event transformer.

19. The non-transitory computer-storage medium of claim 16, wherein replacing the plurality of expressions referencing the native functions of the browser comprises:

replacing, using the plurality of transformers, expressions in the plurality of entities referencing the native functions of the browser with the expressions including the one or more references that are set upon execution.

20. The non-transitory computer-storage medium of claim 15, wherein the processor to perform operations further comprising:

generating the iframe associated with the pure untouched version of native functions, wherein the iframe comprises the iframe window.

\* \* \* \* \*

UNITED STATES PATENT AND TRADEMARK OFFICE
CERTIFICATE OF CORRECTION

PATENT NO. : 11,755,290 B2
APPLICATION NO. : 17/854913
DATED : September 12, 2023
INVENTOR(S) : Bessiere et al.

It is certified that error appears in the above-identified patent and that said Letters Patent is hereby corrected as shown below:

In the Specification

In Column 3, Line 9, delete "122," and insert --122.-- therefor

In Column 3, Line 16, delete "ANDKOID™" and insert --ANDROID™-- therefor

In Column 9, Line 36, delete "browser," and insert --browser.-- therefor

In Column 9, Line 39, delete "example;" and insert --example,-- therefor

In Column 10, Line 42, delete "504," and insert --504.-- therefor

In Column 10, Line 56, delete "expression," and insert --expression.-- therefor

In Column 11, Line 7, delete "602," and insert --602.-- therefor

In Column 12, Line 36, delete "machines, in" and insert --machines. In-- therefor In Column 12, Line 67, delete "Set." and insert --Set-- therefor In Column 13, Line 4, delete "integrated" and insert --Integrated-- therefor In Column 13, Line 19, delete "706," and insert --714,-- therefor In Column 13, Line 38, after "that", insert --the--

In Column 13, Line 45, delete "(LC))," and insert --(LCD),-- therefor

In Column 14, Line 8, delete "stilt" and insert --still-- therefor

Signed and Sealed this
Fifteenth Day of October, 2024

*Katherine Kelly Vidal*
Katherine Kelly Vidal
*Director of the United States Patent and Trademark Office*

CERTIFICATE OF CORRECTION (continued)
U.S. Pat. No. 11,755,290 B2

In Column 14, Line 56, delete "Bluetooth®Low" and insert --Bluetooth® Low-- therefor In Column 14, Line 65, delete "(REID)" and insert --(RFID)-- therefor In Column 15, Line 25, delete "(HTTP))," and insert --(HTTP)).-- therefor In Column 17, Line 14, delete "(CPRS)" and insert --(GPRS)-- therefor In Column 17, Line 57, delete "processor," and insert --processor.-- therefor In Column 17, Line 66, delete "component"(or" and insert --component" (or-- therefor In the Claims In Column 22, Line 6, in Claim 15, after "set", delete "at"